(12) United States Patent
Stoner

(10) Patent No.: US 9,729,575 B1
(45) Date of Patent: Aug. 8, 2017

(54) METHODS, SYSTEMS, AND COMPUTER READABLE MEDIUMS FOR PERFORMING CENTRALIZED MANAGEMENT OF CONVERGED INFRASTRUCTURE SYSTEM CREDENTIAL INFORMATION

(71) Applicant: VCE Company, LLC, Richardson, TX (US)

(72) Inventor: Thaddeus W Stoner, Clearwater, FL (US)

(73) Assignee: VCE IP HOLDING COMPANY LLC, Richardson, TX (US)

( * ) Notice: Subject to any disclaimer, the term of this patent is extended or adjusted under 35 U.S.C. 154(b) by 91 days.

(21) Appl. No.: 14/140,845

(22) Filed: Dec. 26, 2013

(51) Int. Cl.
*H04L 29/06* (2006.01)

(52) U.S. Cl.
CPC ..................... *H04L 63/20* (2013.01)

(58) Field of Classification Search
CPC .... G06F 21/45; G06F 2221/2137; G06F 9/46; G06F 9/5061; H04L 63/0846
USPC .............................................. 726/6
See application file for complete search history.

(56) References Cited

U.S. PATENT DOCUMENTS

| | | | | |
|---|---|---|---|---|
| 2003/0018919 | A1* | 1/2003 | Arbab | H04L 63/0815 726/5 |
| 2008/0313731 | A1* | 12/2008 | Iftimie | G06F 21/31 726/18 |
| 2009/0049531 | A1* | 2/2009 | Norman | H04L 9/12 726/5 |
| 2009/0320108 | A1* | 12/2009 | Livingston | G06F 21/31 726/6 |
| 2013/0263250 | A1* | 10/2013 | Leckey | H04L 63/0846 726/18 |
| 2014/0109097 | A1* | 4/2014 | Datla et al. | 718/102 |

* cited by examiner

*Primary Examiner* — Harunur Rashid
(74) *Attorney, Agent, or Firm* — Jenkins, Wilson, Taylor & Hunt, P.A.

(57) ABSTRACT

Methods, systems, and computer readable mediums for managing credential information are disclosed. According to one method, the method includes, at a credential management module (CMM) associated with a converged infrastructure system (CIS), establishing communication with at least one or more converged infrastructure elements (CIEs) included in a CIS. The method further includes receiving a credential policy corresponding to each of the at least one or more CIEs and generating credential information in accordance with the received credential policy.

16 Claims, 4 Drawing Sheets

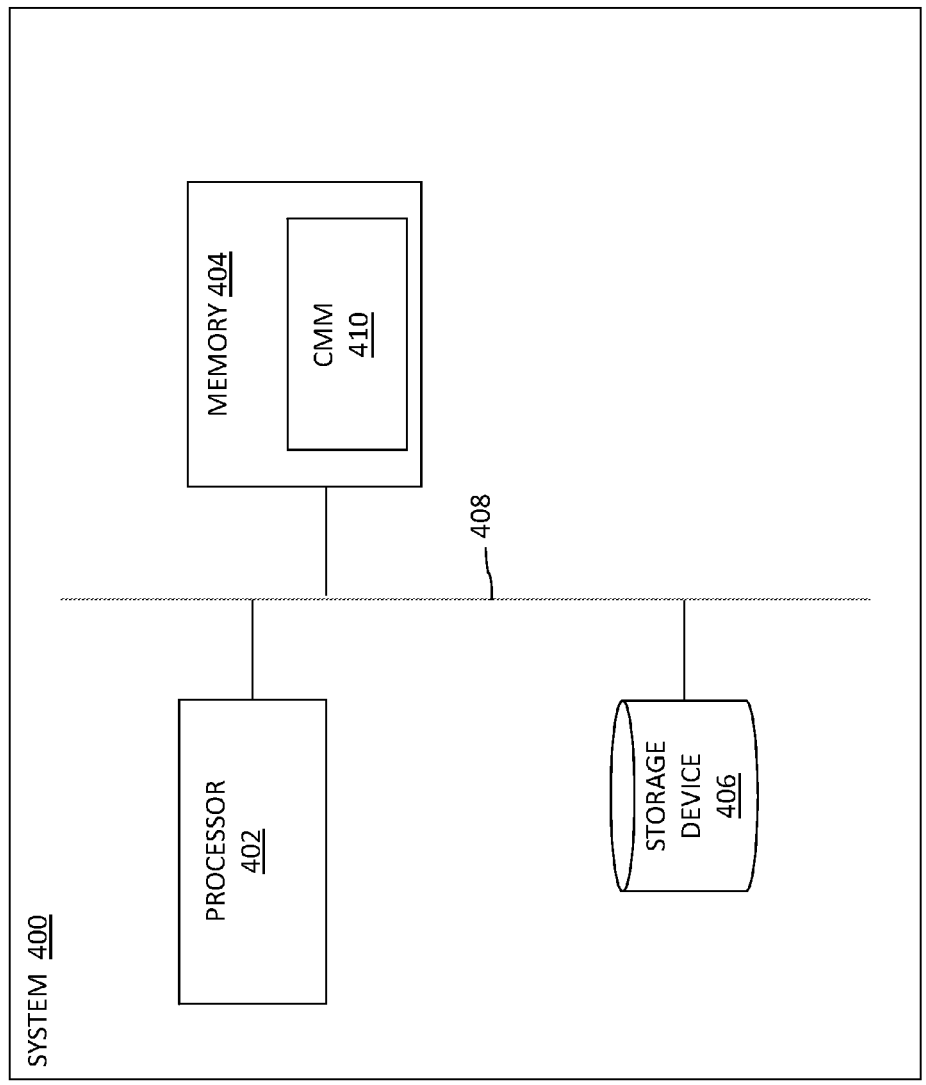

METHODS, SYSTEMS, AND COMPUTER READABLE MEDIUMS FOR PERFORMING CENTRALIZED MANAGEMENT OF CONVERGED INFRASTRUCTURE SYSTEM CREDENTIAL INFORMATION

TECHNICAL FIELD

The subject matter described herein relates to managing credential information. More specifically, the subject matter relates to methods, systems, and computer readable mediums for performing centralized management of converged infrastructure system credential information.

BACKGROUND

A converged infrastructure system (CIS) is a single, optimized computing solution that includes a plurality of component devices, such as servers, data storage devices, networking equipment and software. Notably, each of these CIS components can be supplied by a different vendor and may have its own method of administrative access (e.g., each component device is preconfigured with its own unique administrative access method and password). For example, a component can be accessed via exemplary methods that include, but are not limited to, a command line, an agreement action, or a token. In some instances, a system administrator assigned to manage device access credential information (i.e., passwords and different means of access) may do so by using a software table or handwritten data sheet. One potential problem associated with such a manner of record keeping is that passwords can become well known and less secure over a period of time. Presently, software exists for password storage purposes, but such software applications are not configured to perform credential and/or password replacements on an automatic and routine basis. Namely, replacements passwords associated with a CIS may require the administrator to access each CIS component device and change the password individually. Such manual efforts are extremely time consuming and inconvenient to system administrators.

SUMMARY

In accordance with this disclosure, methods, systems, and computer readable mediums for performing centralized management of converged infrastructure system credential information are disclosed. According to one embodiment, the subject matter described herein can comprise a method for managing credential information that includes, at a credential management module (CMM) associated with a converged infrastructure system (CIS), establishing communication with at least one or more converged infrastructure elements (CIEs) included in a CIS. The method further includes receiving a credential policy corresponding to each of the at least one or more CIEs and generating credential information in accordance with the received credential policy.

BRIEF DESCRIPTION OF THE DRAWINGS

The subject matter described herein will now be explained with reference to the accompanying drawings of which:

FIG. 4 is a block diagram of a general purpose computer system utilized in accordance with embodiments of the subject matter described herein.

DETAILED DESCRIPTION

Figure 1:
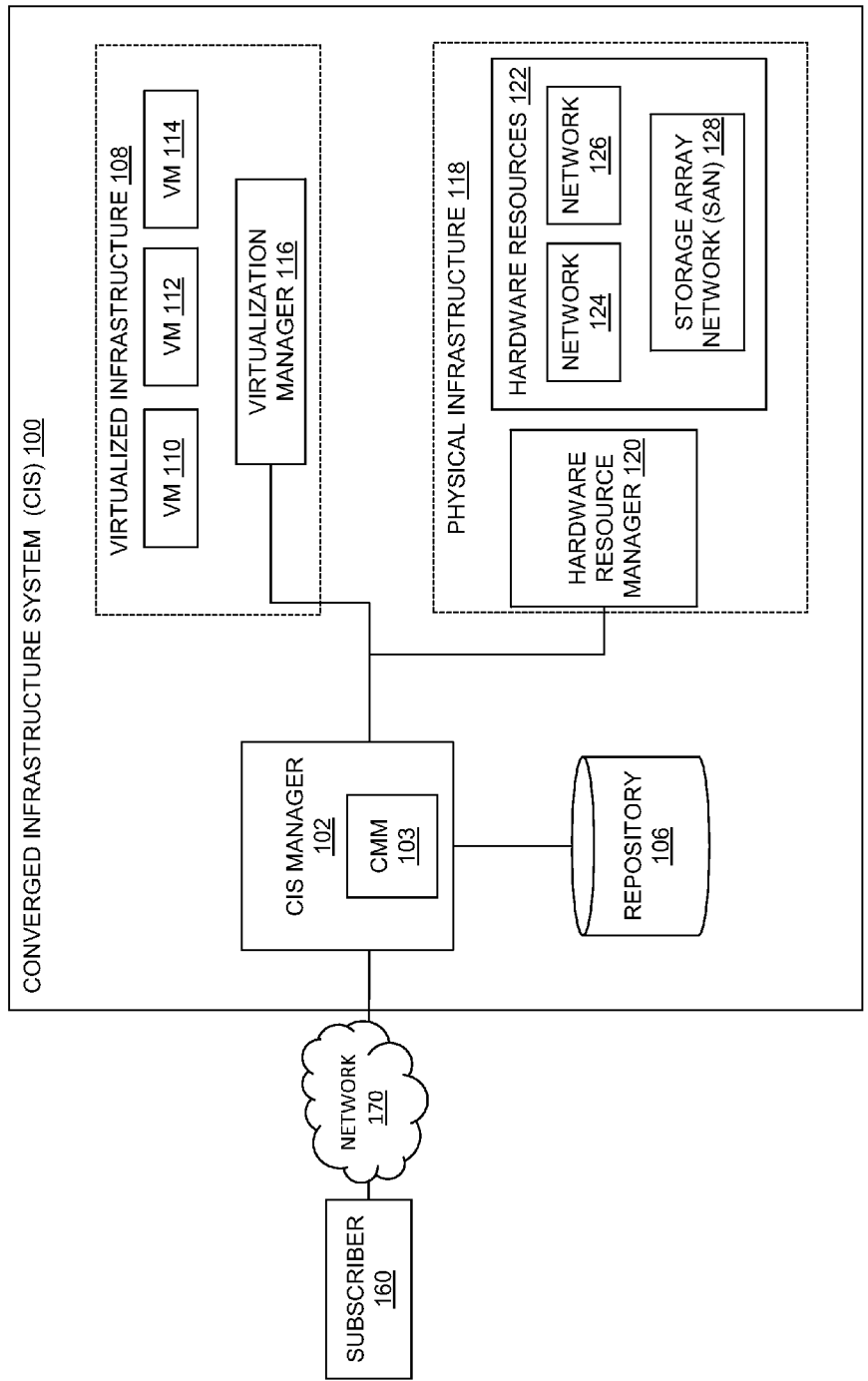
FIG. 1 is a diagram illustrating exemplary converged infrastructure systems in accordance with embodiments of the subject matter disclosed herein.

The subject matter described herein discloses methods, systems, and computer readable mediums for conducting centralized management of converged infrastructure system credential information. As used herein, a CIS, such as a Vblock™ System from VCE Company, LLC, can comprise multiple components or elements in a preconfigured or prepackaged computing platform. For example, a CIS can comprise a computing platform associated with racks of physical components and related software for performing virtualization and/or other information technology (IT) functions. In some embodiments, each component associated with a CIS can comprise a computing component, a software component, a networking component, a hardware component, or a firmware component. For example, a CIS can comprise data storage devices, servers, networking equipment, and software for managing physical resources and/or virtualized resources (e.g., virtual servers).

In accordance with some embodiments of the subject matter disclosed herein, a credential management module (CMM) can be communicatively connected to a plurality of converged infrastructure elements (CIEs) and configured to manage credential information associated with these CIEs. After the CMM is installed into the CIS, the CMM can communicate with the CIEs through secured communication access. In some embodiments, an administrator may set one or more initial access credentials (e.g., password) on one or more CIEs. Afterwards, the administrator may provision the CMM with the initial access credentials for the CIEs (i.e., the same initial access credential provisioned on the CIEs). The CMM can then obtain administrative access to the CIEs and be configured to receive credential policies designed to manage CIE access credentials. As used herein, the terms "credential information" or "credential" or "access credential" are synonymous terms referring to access elements including access passwords, access cookies, or access tokens configured to access converged infrastructure elements. In some embodiments, a credential policy can comprise a set of rules designed to enhance system security and can also comprise a parameter configured to rotate CIE credential information on a periodic basis. An administrator can manage and rotate CIE access credentials according to the rules and parameters set out in the credential policy, for example, through a dedicated graphical user interface (GUI). As used herein, the terms "rotation" or "rotating" or "rotate" passwords or credential information refer to the replacement, the modification, the changing, and/or resetting of existing passwords or credential information with newly generated passwords or credential information in accordance to the rules and parameters included in one or more credential policies.

Moreover, in accordance with some embodiments of the subject matter disclosed herein, the CMM can be configured to retrieve a CIE access credential upon a request from a subscriber (e.g., a subscribed user of a CIS). For example, upon receiving a subscriber request, the CMM can access a secure table designed to store CIE access credentials and provide the requested credential back to the subscriber.

Reference will now be made in detail to exemplary embodiments of the subject matter described herein, examples of which are illustrated in the accompanying drawings. Wherever possible, the same reference numbers will be used throughout the drawings to refer to the same or like parts.

FIG. 1 is a diagram illustrating exemplary CIS 100 according to an embodiment of the subject matter described herein. In some embodiments, CIS 100 can comprise one or more physical resources and one or more virtual resources. Exemplary physical resources can comprise a processor, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. CIS 100 can also comprise software and related components for managing the CIS and/or portions therein.

In some embodiments, CIS 100 can be a Vblock System configured to provide data center functionality, cloud service functionality, and/or other IT functionality. In some embodiments, CIS 100 can communicate with various other entities, such as other CISs, network nodes, and subscribers. For example, subscriber 160 (e.g., a human operator or an automated system) may use an application programming interface (API) or web-based graphical user interface to login to CIS 100 to request credential information for a particular CIS component.

In some embodiments, CIS 100 can comprise a CIS manager 102 (e.g., a CIS management module), a repository 106, virtualized infrastructure 108, and/or physical infrastructure 118. CIS manager 102 can be any suitable entity for managing aspects of CIS 100. CIS manager 102 can be configured to communicate with various CIS components, such as virtual resources, physical resources, and/or software for managing various components. For example, CIS manager 102 can be configured to manage performance, resource utilization levels, and other aspects associated with virtualized infrastructure 108 and/or physical infrastructure 118. In some embodiments, CIS manager 102 comprises VCE Vision' Intelligent Operations software and/or firmware. In some embodiments, CIS manager 102 can be provisioned with a credential management module (CMM) 103.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 can be configured to perform various functions and/or services, such as web server functions or cloud application services, and may interact with various nodes, components, and/or subscribers.

In some embodiments, virtualized infrastructure 108 can be associated with one or more virtual entities. Each virtual entity can comprise one or more CIS or portions therein, e.g., resources from one or more CISs. In some embodiments, virtualization manager 116 may allow logical entities to be created, deleted, or modified using an API and/or GUI. Virtualization manager 116 can be any suitable entity (e.g., software executing in a virtual machine) for managing aspects associated with virtualized infrastructure 108. In some embodiments, virtualization manager 116 can be configured to provide data center management through one or more communications interfaces. For example, virtualization manager 116 may communicate with one or more third-party management tools using APIs.

Physical infrastructure 118 can comprise hardware or physical resources 112, such as network 124 and network 126 (sometimes referred to as "hosts") and one or more storage array networks (SAN), such as SAN 128. Hardware resources 122 can be communicatively connected to various other components in CIS 100 and other entities. Hardware resources 122 can be configured to be used by one or more virtual entities. For example, network 124 and SAN 128 can be used in implementing VM 110 and VM 112, respectively.

Hardware resource manager 120 can be any suitable entity (e.g., software executing in a virtual machine) for managing aspects associated with physical infrastructure 118. In some embodiments, hardware resource manager 120 can be configured to provision hardware resources 122 via one or more communications interfaces. For example, hardware resource manager 120 may provision hardware resources 122 for implementing one or more virtual entities in virtualized infrastructure 108.

Repository 106 can comprise any data storage unit (e.g., a database or plurality of databases) that can be configured to function as a centralized credential information storage unit for the components of CIS 100. Although FIG. 1 depicts repository 106 as a local data storage unit residing on CIS 100, repository 106 can also be embodied as a data storage unit located at a public distributed content site, on a local proxy server in a customer's environment, or on a different CIS without departing from the scope of the disclosed subject matter.

It will be appreciated that FIG. 1 is for illustrative purposes and that various nodes, their locations, and/or their functions as described above in relation to FIG. 1 can be changed, altered, added, or removed.

Figure 2:
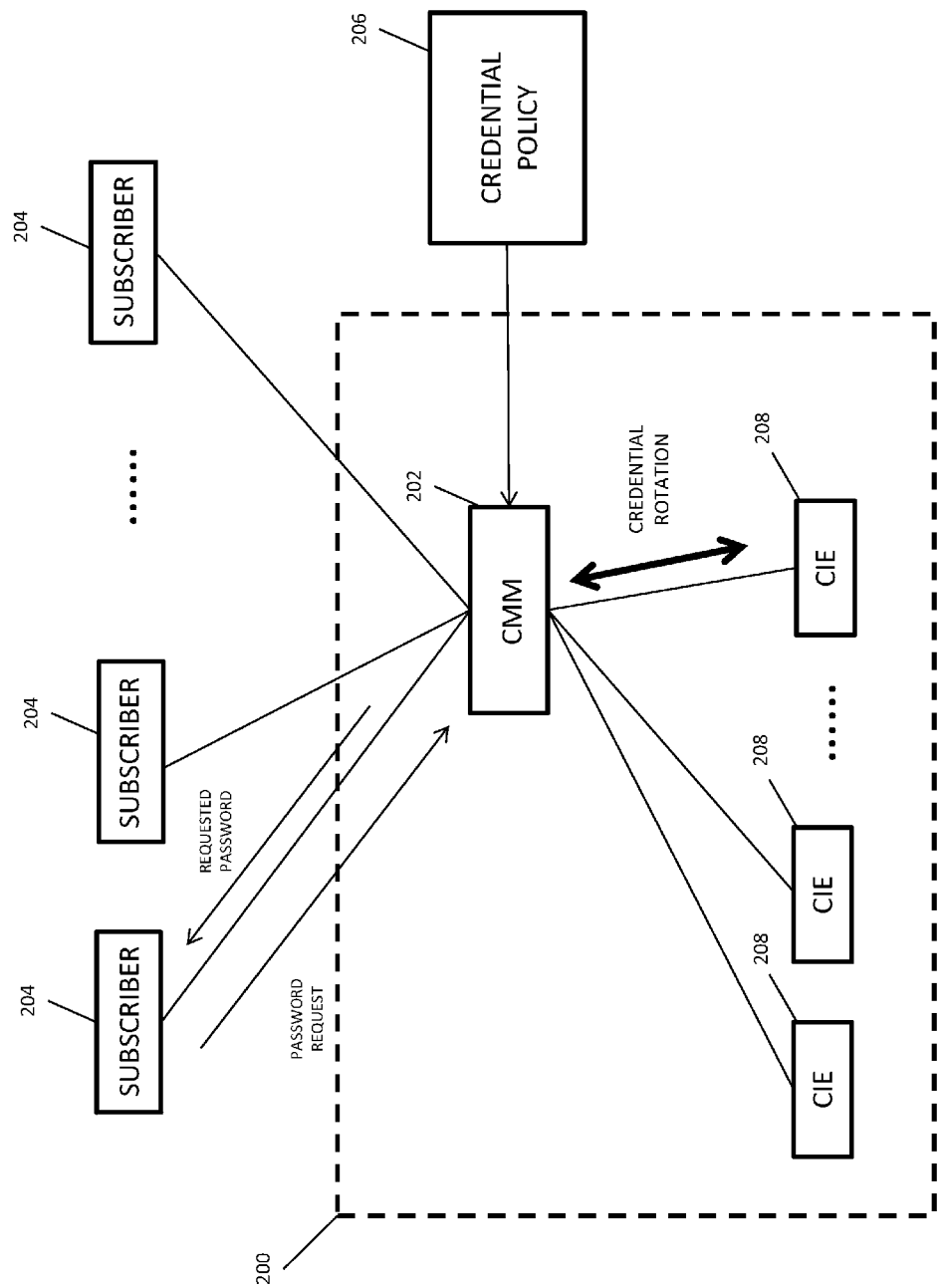
FIG. 2 illustrates an exemplary configuration of a credential management module communicating to a plurality of subscribers and converged infrastructure elements in accordance with embodiments of the subject matter described herein.

FIG. 2 illustrates an exemplary configuration of a credential management module communicating to a plurality of subscribers and converged infrastructure elements in accordance with embodiments of the subject matter described herein. As shown in FIG. 2, a CIS 200 comprises a CMM 202 that can be communicatively connected to a plurality of subscribers 204 and a plurality of CIEs 208. Moreover, CMM 202 can be configured to receive one or more credential policies 206 from system administrators or the customer end users (e.g., owner of CIS). In some embodiments, CMM 202 can be configured to operate its own virtual machine. In some embodiments, CMM 202 comprises a module embedded in a software entity (e.g., see CMM 103 in FIG. 1). In some embodiments, CMM 202 can comprise a module integrated into the VCE Vision software (or some other CIS management software) and can be configured to manage CIE credential information associated with CIS 200. CMM 202 can perform credential information management through a centralized interface communicatively connected to CIEs 208 associated with the CIS. In some embodiments, CIEs 208 can comprise the components of the physical infrastructure 118 and the components of virtualized infrastructure 108 shown in FIG. 1.

In some embodiments, CMM 202 can be integrated into CIS 200 during manufacturing. For example, at a factory where CIEs 208 are being assembled into CIS 200, CMM 202 can be loaded into the operating system of CIS 200. Each individual CIE 208 can be preconfigured with its own unique method in which administrative access is granted (e.g., via a command line, via an agree action, via a token, and/or the like). Once CMM 202 is installed and an appropriate communications path is available, CMM 202 can be configured to establish communication with each CIE 208 (e.g., establish communication with one or more multiple CIEs in CIS 200) through the CIE's secured communication access (e.g., via a command line or a secured HTTP interface). In some embodiments, prior to the communications path being established between CMM 202 and one or more multiple CIEs 208, an initial and/or administrative access credential associated with each CIE 208 can be supplied by an administrator to CMM 202, thereby giving CMM 202 the authority and/or administrative access to update and/or rotate CIE credential information from that point on. In some embodiments, an initial default access credential (e.g., password) can be set in the CIE by the manufacturer of the CIE prior to the CIS component being delivered to a CIS assembly site. In such scenarios, the CIS manufacturing process can utilize a script that enables an administrator to modify or change the initial default credential information of the CIE. The administrator may then manually provide the modified credential information to the CMM.

In some embodiments, a customer or credential policy 206 can be provided to CMM 202. For example, a CIS administrator can provide credential policy 206 to the manufacturer such that credential policy 206 can be provisioned on CMM 202 prior to the delivery of CIS 200 to the customer end user. Alternatively, credential policy 206 can be introduced to CMM 202 any time after the delivery of CIS 200. In some embodiments, credential policy 206 can comprise a set of rules designed to enhance system security. In some embodiments, a system administrator (or other person authorized by the customer end user) can access CMM 202 from a remote client to create or modify a credential policy for CMM 202. For example, credential policy 206 can comprise parameters such as a minimum password length (e.g., eight characters or more), the use of both upper-case and lower-case letters, the inclusion of one or more numerical digits, the inclusion of special characters (e.g., @, #, $), the prohibition of words found in a dictionary or the system administrator's personal information, the prohibition of passwords that match the format of calendar dates, license plate numbers, telephone numbers or other common numbers, and/or the prohibition of the system administrator's company name or abbreviation.

In some embodiments, CMM 202 can be configured to generate credential information such as passwords for at least one CIE 208 after receiving a respective at least one credential policy 206. The generated credential information will conform to the requirements established in credential policy 206 and can be collectively managed by CMM 202 through a control surface and/or a graphical user interface.

In some embodiments, credential policy 206 can be received at CMM 202 from a security administrator associated with CIS 200 and the received credential policy 206 can comprise a parameter designed to limit the time period an access credential (e.g., credential information) for each of one or more CIEs in a CIS can remain valid. For example, credential policy 206 can configure CMM 202 to designate credential information associated with each CIE 208 (e.g., all of the CIEs in a CIS) to remain valid for 12 months. Alternatively, separate credential policies may be used to configure CMM 202 to designate credential information for a first group of CIEs to be valid for one month and designate credential information for a second group of CIEs to be valid for six months. Similarly, a single credential policy may be used to configure CMM 202 to designate the valid time period of the credential information associated with a respective single CIE. In some embodiments, CMM 202 can maintain on-going communications with each CIE 208 associated with the CIS utilizing secured communications protocols, such as Transport Layer Security (TLS)/Secure Socket Layer (SSL), a Secure Shell (SSH), a Secure File Transfer Protocol (SFTP), a Secure Copy Protocol (SCP), and/or other similar secured communication mechanisms. As such, CMM 202 can be configured to rotate or change CIE access credential information (e.g., passwords) on a periodic basis as dictated by credential policy 206. For example, in the event the credential information has expired (e.g., exceeded an expiration duration), CMM 202 can be configured to automatically generate new credential information (e.g., a new password) in accordance with the requirements set out in credential policy 206. In some embodiments, the CIE access credential information can be reset or rotated in an order based on the interdependencies that exist among CIEs 208. For example, a determination can be made to reset credential information associated with a first group of CIEs before resetting credential information for a second group of CIEs. In another example, credential information associated with a first group of CIEs and a second group of CIEs may be reset or rotated in a parallel fashion.

Furthermore, CMM 202 can be configured to rotate the credential information associated with each of the components of CIS 200 at any time (e.g., upon an administrator's request). In some embodiments, CMM 202 can comprise a GUI which can be configured to allow an administrator to interact with one or more of CIEs 208 included in CIS 200. For example, the GUI can comprise user interface elements, such as a pull down menu or a push button (not shown), that are configured to provide the administrator the option to change all of the credentials associated with CIS 200. At a push of a button, the administrator is capable of rotating or renewing all credential information prior to expiration. Notably, this configuration can advantageously lower CIS maintenance costs because the administrator does not have to access each CIE 208 separately and reset access credentials on an individual basis.

In some embodiments, credential information (e.g., password) associated with an individual CIE can be reset at any time. For example, an administrator can have direct access to a CIE (i.e., CIE 208) and reset existing credential information (e.g., an old password) associated with the CIE with new credential information (e.g., a new password). The administrator can subsequently provide the new credential information associated with the CIE to CMM 202 in order to update CMM 202 with the latest credential information.

In addition, CMM 202 can be configured to manage (e.g., keep track of) previously used credential information (e.g., passwords). For example, CMM 202 can comprise a module configured to store and analyze previously used credential information. In some embodiments, previously used credential information can be retrieved for credential recovery purposes. In other embodiments, previously used credential information can be collected and analyzed by CMM 202 to generate new credential information that is more robust. For example, CMM 202 can be configured to generate new credential information (e.g., passwords) that does not utilize any previously used alphanumeric combinations, therefore making the newly generated credential information more secure. In some embodiments, newly generated credential information can be stored in a centralized repository such as a secure table and can be retrieved by CMM 202 upon request.

In some embodiments, CMM 202 can be configured to retrieve CIE credential information upon a subscriber's (e.g., subscriber 204) request. For example, CMM 202 can be connected (e.g., be accessible) to a plurality of subscribers 204 and configured to manage the credential information associated with each CIE 208 included CIS 200. In some embodiments, subscriber 204 can seek access to a CIE 208 by requesting (and subsequently receiving) an access credential (e.g., credential information) from CMM 202 utilizing secured communications protocols, such as TLS/SSL, SSH, SFTP, SCP, and/or other similar secured communication mechanisms. Such request can be sent to CMM 202, by way of example and without any limitation, through a dedicated GUI or an API call. Upon receiving the request, CMM 202 can obtain (e.g., look up) access credentials and send the credential information back to subscriber 204. For example, subscriber 204 seeking access to a router associated with CIS 200 may submit a credential information request to CMM 202 through an API call. Upon receiving the request, CMM 202 can query a secure table and reply to subscriber 204 with the router access credential of the moment (e.g., the current and valid credential information for the router component).

In some embodiments, the credential information retrieved by CMM 202 can be encrypted and remain valid for a predetermined amount of time. For example, the router access credential retrieved by CMM 202 may only be valid for 60 minutes. Thus, once the access credential has expired, subscriber 204 will have to submit another request to CMM 202 for new credential information.

In some embodiments, subscriber 204 can submit a request to CMM 202 to extend the duration of the credential information. For example, subscriber 204 may receive a router access credential from CMM 202 that is valid for only 5 minutes. In such a situation, subscriber 204 may submit a request to CMM 202 to extend the duration of the access credential for an additional 30 minutes. In some embodiments, credential information can expire while subscriber 204 is in the process of accessing CIE 208. In such a situation, CIE 208 can be configured to notify subscriber 204 that further access to CIE 208 will be denied via a notification or prompt message. Upon receiving the notification message, subscriber 204 can submit a request to CMM 202 to either extend the duration of the credential information or issue new credential information.

Figure 3:
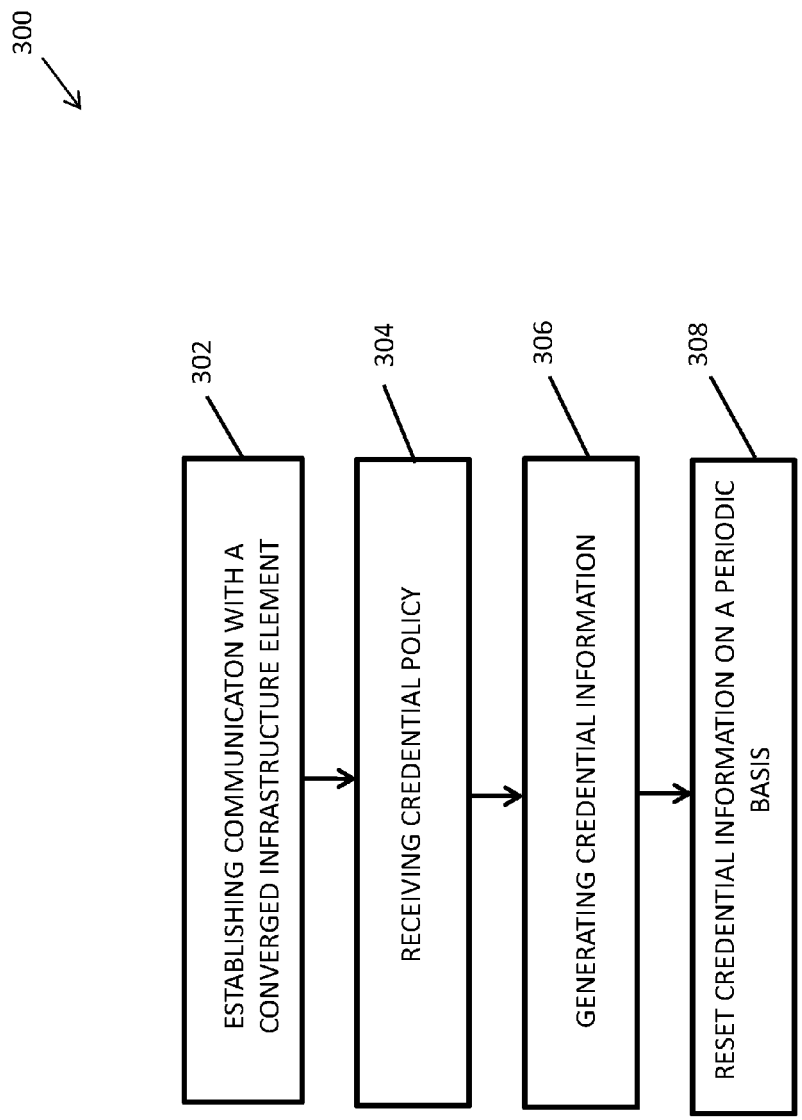
FIG. 3 is a flow chart illustrating an exemplary process for managing credential information in accordance with embodiments of the subject matter described herein.

FIG. 3 is a flow chart illustrating an exemplary process 300 for managing credential information in accordance with embodiments of the subject matter described herein. At step 302, communication is established between the CMM and one or more converged infrastructure elements associated with or included in the CIS. Upon being installed in the CIS, the CMM is configured to communicate to one or more CIEs through a CIE's secured communication access, for example, via a command line or a secured HTTP interface. Prior to any communication being established between the CMM and a CIE, an initial and/or administrative access credential (e.g., initial credential information) is provided to the CIE and the CMM by the administrator, thereby providing the CMM with authority and/or administrative access to update and/or rotate CIE credentials from that point on. For example, the CMM is configured to rotate CIE credential information (e.g., resetting existing access credentials with new access credentials) on a periodic basis. In some embodiments, a plurality of initial access credentials associated with a respective plurality of CIEs can be provided to the CMM.

At step 304, a credential policy is received by the CMM. In some embodiments, a credential policy is provided to the CMM. For example, a CIS system administrator can provide a credential policy to a CIS manufacturer. The CIS manufacturer may then provision the credential policy on the CMM prior to the delivery of the CIS. Alternatively, the credential policy can be provided to the CMM at any time after the delivery of the CIS. In some embodiments, a system administrator can access (e.g., log into) the CMM from a remote client to create or modify a credential policy. In some embodiments, the credential policy is a set of rules designed to enhance system security. For example, a credential policy can be configured to require CIE credential information to include parameters such as minimum password length, the use of both upper-case and lower-case letters, inclusion of one or more numerical digits, and the like.

At step 306, the CMM is configured to generate credential information in accordance with the received credential policy. In some embodiments, credential information such as passwords for individual CIEs are generated by the CMM after the CMM receives one or more credential policies. The generated credential information will conform to the requirements set out in the client credential policy and are collectively managed by the CMM through a control surface and/or a graphical user interface.

At step 308, credential information is reset (e.g., rotated) on a periodic basis. In some embodiments, a credential policy is received at the CMM from a security administrator associated with the CIS. The received credential policy can include a parameter designed to indicate a duration in which the associated CIE credential information will remain valid. In some embodiments, the CMM can be configured to maintain continuous communications with each CIE utilizing secured communications protocols, such as TLS/SSL, SSH, SFTP, and/or SCP. As such, the CMM can be configured to rotate or reset CIE credential information on a periodic basis as dictated by the received credential policy. For example, when credential information (e.g., a password) associated with a CIE expires, the CMM is configured to automatically generate new credential information in accordance with the requirements set out in the credential policy. Namely, the expired credential information is reset with the new credential information and any subscriber seeking to access the associated CIE can send a request to the CMM to obtain the new credential information using a dedicated GUI or an API call.

FIG. 4 depicts a high level block diagram of a general purpose computer system suitable for use in performing the functions described herein. As depicted in FIG. 4, system 400 comprises a processor 402, a memory 404, a storage device 406, and communicatively connected via a system bus 408. In some embodiments, processor 402 can comprise can comprise a microprocessor, central processing unit (CPU), or any other like hardware based processing unit. In some embodiments, a CMM 410 can be stored in memory 404, which can comprise random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation of CMM 410. In some embodiments, storage device 406 can comprise any storage medium or storage unit that is configured to store data accessible by processor 402 via system bus 408. Exemplary storage devices can comprise one or more local databases hosted by system 400.

As indicated above, the subject matter described herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used herein, the term "module" refers to hardware, firmware, or software in combination with hardware and/or firmware for implementing features described herein.

While the systems and methods have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A method for managing credential information in a converged infrastructure system (CIS), the method comprising:
   at a credential management module (CMM) associated with a CIS:
      establishing communication with converged infrastructure elements (CIEs) included in the CIS via a secure communication access interface, wherein the CIEs comprise a plurality of components of a physical infrastructure of the CIS and a plurality of components of a virtualized infrastructure of the CIS;
      receiving a credential policy corresponding to each of the CIEs, wherein receiving a credential policy includes receiving a set of rules for generating the credential information that comprises a parameter that indicates a duration in which the credential information remains valid, and wherein the method comprises supplying an access credential to a subscriber associated with the CIS to access a first CIE, after the duration in which the credential information remains valid expires, notifying the subscriber that further access to the first CIE will be denied while the subscriber is accessing the first CIE, receiving a request from the subscriber to extend the duration of the access credential, and extending the duration of the access credential so that the subscriber can continue accessing the first CIE;
      generating, for each of CIEs, credential information in accordance with the received credential policy;
      providing the generated credential information to the subscriber; and
      resetting the credential information for a plurality of the CIEs based on interdependencies that exist among the plurality of the CIEs, wherein resetting the credential information for a plurality of the CIEs based on interdependencies includes determining, based on interdependencies between at least some of the plurality of components of the physical infrastructure of the CIS and at least some of the plurality of components of the virtualized infrastructure of the CIS, to reset credential information for a first group of the plurality of CIEs before resetting credential information for a second group of the plurality of CIEs.

2. The method of claim 1 wherein establishing communication with the at least one or more CIEs comprises communicating with the at least one or more CIEs via a secured communication protocol that is at least one of a Transport Layer Security (TLS) protocol, a Secure Socket Layer (SSL) protocol, a Secure Shell (SSH) protocol, a Secure File Transfer Protocol (SFTP), and a Secure Copy Protocol (SCP).

3. The method of claim 1 wherein generating the credential information comprises storing the generated credential information in a secured table within a repository associated with the CIS.

4. The method of claim 1 further comprising resetting the credential information associated with the at least one or more CIEs.

5. The method of claim 4 wherein the credential information is reset on a periodic basis by the CMM.

6. The method of claim 4 wherein the credential information is reset by the CMM upon the CMM receiving an administrator request.

7. A system for managing credential information, the system comprising:
   converged infrastructure elements (CIEs) associated with a converged infrastructure system (CIS), wherein the CIEs comprise a plurality of components of a physical infrastructure of the CIS and a plurality of components of a virtualized infrastructure of the CIS; and
   a credential management module (CMM) configured to establish communication with each of the CIEs via a secure communication access interface, to receive a credential policy corresponding to each of the CIEs that includes receiving a set of rules for generating the credential information that comprises a parameter that indicates a duration in which the credential information remains valid, to generate, for each of the CIEs, credential information in accordance with the received credential policy, to provide the generated credential information to a subscriber associated with the CIS, and to reset the credential information for a plurality of the CIEs based on interdependencies that exist among the plurality of the CIEs via a determination, based on interdependencies between at least some of the plurality of components of the physical infrastructure of the CIS and at least some of the plurality of components of the virtualized infrastructure of the CIS, to reset credential information for a first group of the plurality of CIEs before resetting credential information for a second group of the plurality of CIEs
wherein the CMM is further configured to supply an access credential to the subscriber to access a first CIE, after the duration in which the credential information remains valid expires, to notify the subscriber that further access to the first CIE will be denied while the subscriber is accessing the first CIE, to receive a request from the subscriber to extend the duration of the access credential, and to extend the duration of the access credential so that the subscriber can continue accessing the first CIE.

8. The system of claim 7 wherein the CMM is further configured to communicate with the at least one or more CIEs via a secured communication protocol that is at least one of a Transport Layer Security (TLS) protocol, a Secure Socket Layer (SSL) protocol, a Secure Shell (SSH) protocol, a Secure File Transfer Protocol (SFTP), and a Secure Copy Protocol (SCP).

9. The system of claim 7 wherein the CMM is further configured to store the generated credential information in a secured table within a repository associated with the CIS.

10. The system of claim 7 wherein the CMM is further configured to reset the credential information associated with each of the CIEs.

11. The system of claim 10 wherein the CMM is further configured to reset the credential information on a periodic basis.

12. The system of claim 10 wherein the CMM is further configured to reset the credential information upon receiving an administrator request.

13. A non-transitory computer readable medium having stored thereon executable instructions that when executed by a processor of a computer control the computer to perform steps comprising:
   at a credential management module (CMM) associated with a CIS
      establishing communication with converged infrastructure elements (CIEs) included in the CIS via a secure communication access interface, wherein the CIEs comprise a plurality of components of a physical infrastructure of the CIS and a plurality of components of a virtualized infrastructure of the CIS;
   receiving a credential policy corresponding to each of the CIEs, wherein receiving a credential policy includes receiving a set of rules for generating the credential information that comprises a parameter that indicates a duration in which the credential information remains valid, and wherein the method comprises supplying an access credential to a subscriber associated with the CIS to access a first CIE, after the duration in which the credential information remains valid expires, notifying the subscriber that further access to the first CIE will be denied while the subscriber is accessing the first CIE, receiving a request from the subscriber to extend the duration of the access credential, and extending the duration of the access credential so that the subscriber can continue accessing the first CIE;
   generating credential information in accordance with the received credential policy;
   providing the generated credential information to the subscriber; and
   resetting the credential information for a plurality of the CIEs based on interdependencies that exist among the plurality of the CIEs, wherein resetting the credential information for a plurality of the CIEs based on interdependencies includes determining, based on interdependencies between at least some of the plurality of components of the physical infrastructure of the CIS and at least some of the plurality of components of the virtualized infrastructure of the CIS, to reset credential information for a first group of the plurality of CIEs before resetting credential information for a second group of the plurality of CIEs.

14. The non-transitory computer readable medium of claim 13 further comprising resetting the credential information associated with the at least one or more CIEs.

15. The non-transitory computer readable medium of claim 14 wherein the credential information is reset on a periodic basis by the CMM.

16. The non-transitory computer readable medium of claim 14 wherein the credential information is reset by the CMM upon the CMM receiving an administrator request.

\* \* \* \* \*